United States Patent
Ouyang

(10) Patent No.: US 8,409,739 B2
(45) Date of Patent: Apr. 2, 2013

(54) BATTERY LATCHING MECHANISM HAVING CONNECTING BLOCK AND RECEIVING HOLE FOR PORTABLE ELECTRONIC DEVICE

(75) Inventor: Zhi-Bin Ouyang, Shenzhen (CN)

(73) Assignees: Shenzhen Futaihong Precision Industry Co., Ltd., Shenzhen (CH); FIH (Hong Kong) Limited, Kowloon (HK)

( * ) Notice: Subject to any disclaimer, the term of this patent is extended or adjusted under 35 U.S.C. 154(b) by 396 days.

(21) Appl. No.: 12/779,117

(22) Filed: May 13, 2010

(65) Prior Publication Data

US 2011/0183174 A1   Jul. 28, 2011

(30) Foreign Application Priority Data

Jan. 23, 2010   (CN) .......................... 2010 1 0300634

(51) Int. Cl.
*H01M 2/02* (2006.01)
*H01M 2/10* (2006.01)
(52) U.S. Cl. .................... 429/97; 429/100; 429/163
(58) Field of Classification Search .............. 429/96, 429/97, 98, 100, 163; 439/159; 455/575.1, 455/347; 320/112; 292/137
See application file for complete search history.

(56) References Cited

U.S. PATENT DOCUMENTS

| | | | | |
|---|---|---|---|---|
| 5,604,050 | A * | 2/1997 | Brunette et al. | 429/97 |
| 5,625,271 | A * | 4/1997 | Shapiro et al. | 320/112 |
| 6,455,188 | B1 * | 9/2002 | McKay et al. | 429/97 |
| 2004/0214077 | A1 * | 10/2004 | Huang | 429/97 |
| 2006/0141344 | A1 * | 6/2006 | Chen et al. | 429/97 |
| 2007/0087600 | A1 * | 4/2007 | Chen et al. | 439/159 |
| 2007/0218961 | A1 * | 9/2007 | Luo et al. | 455/575.1 |
| 2008/0042448 | A1 * | 2/2008 | Ge et al. | 292/137 |
| 2008/0193837 | A1 * | 8/2008 | Lu | 429/163 |
| 2009/0123818 | A1 * | 5/2009 | Huang | 429/98 |

FOREIGN PATENT DOCUMENTS

TW   31195 U1 *  4/2008

* cited by examiner

*Primary Examiner* — Kenneth Douyette
(74) *Attorney, Agent, or Firm* — Altis Law Group, Inc.

(57) ABSTRACT

A portable electronic device includes a battery, a housing, and a latching element. The housing defines a battery compartment and at least one receiving hole. The latching element includes a flat plate, an extension plate and at least one connecting block. The extension plate extends from the flat plate and reaches into the battery compartment to elastically latch the battery. The at least one connecting block projects from the flat plate and is received in the receiving hole and resists the housing.

12 Claims, 6 Drawing Sheets

BATTERY LATCHING MECHANISM HAVING CONNECTING BLOCK AND RECEIVING HOLE FOR PORTABLE ELECTRONIC DEVICE

BACKGROUND

1. Technical Field

The present disclosure relates to battery latching mechanisms and, particularly, to a battery latching mechanism used in a portable electronic device.

2. Description of Related Art

Battery latching mechanisms are usually provided to secure batteries within portable electronic devices. As the demand for multifunctional portable electronic devices rises, batteries of portable electronic devices are desired to be more powerful to satisfy high demands of users. However, most powerful batteries are usually large and heavy, thus strong latch mechanisms are required to secure these large, heavy batteries.

To remove the battery for recharging, the operator must first release the latching mechanism and then separate the battery from the portable electronic device. It can be inconvenient and time consuming to replace the battery.

Therefore, there is room for improvement within the art.

BRIEF DESCRIPTION OF THE DRAWINGS

Many aspects of the exemplary battery latching mechanism can be better understood with reference to the following drawings. The components in the drawings are not necessarily drawn to scale, the emphasis instead being placed upon clearly illustrating the principles of the battery latching mechanism for portable electronic device. Moreover, in the drawings, like reference numerals designate corresponding parts throughout the several views, in which.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
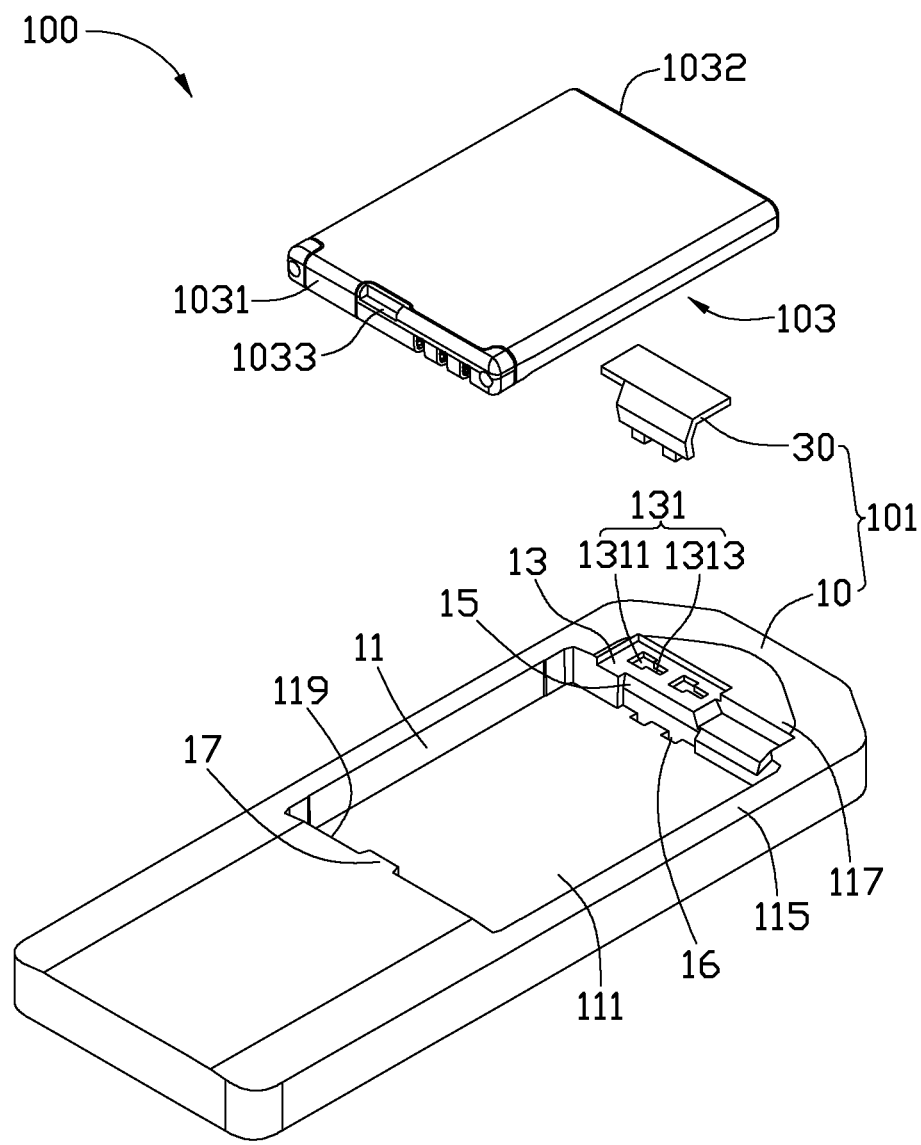
FIG. 1 is an exploded, isometric view of an exemplary embodiment of a portable electronic device.

FIG. 1 is an exploded, isometric view of an exemplary embodiment of a portable electronic device 100, such as a cellular phone, a personal digital assistant (PDA), or a game player, where a battery is desired. The portable electronic device 100 includes a battery latching mechanism 101 and a battery 103. The battery latching mechanism 101 includes a housing 10 and a latching element 30. The latching element 30 is configured for detachably attaching the battery 103 to the housing 10.

The housing 10 defines a battery compartment 11. The battery compartment 11 is cooperatively defined by a supporting wall 111, two sidewalls 115, a first end portion 117, and a second end portion 119 opposite to the first end portion 117.

Figure 2:
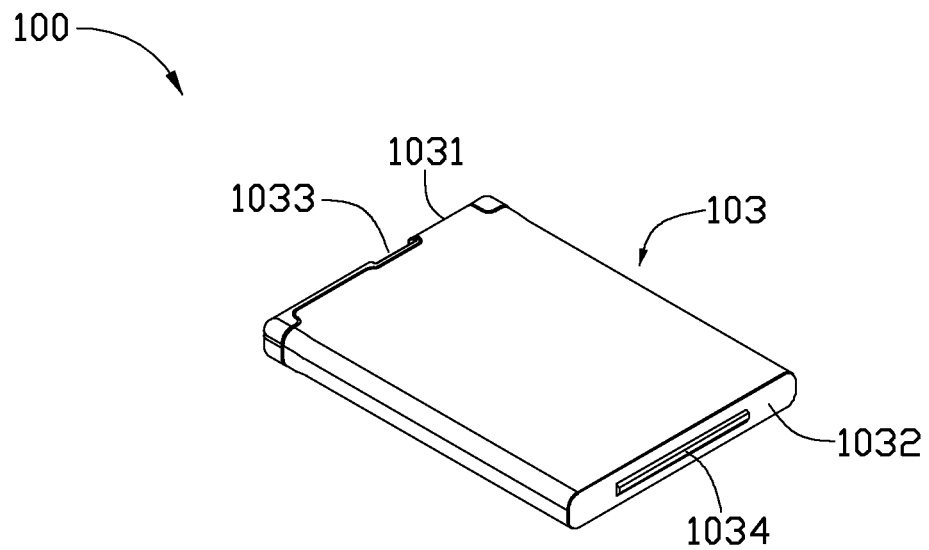
FIG. 2 is similar to FIG. 1, but viewed from another aspect.
Figure 2:
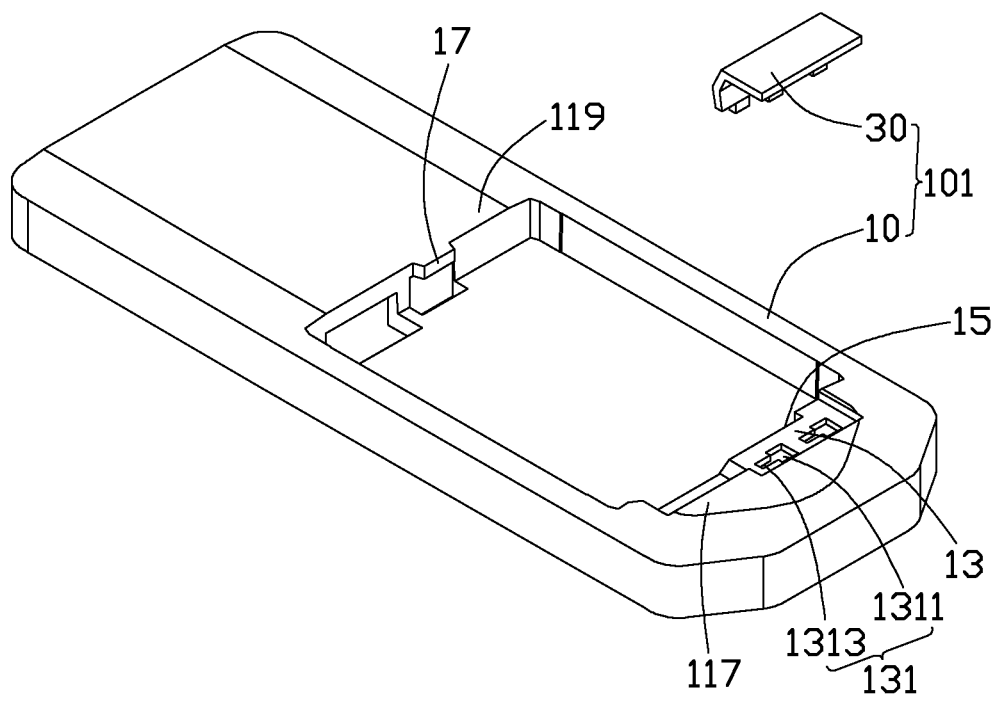

The first end portion 117 defines a receiving groove 13 and a cutout 15 communicating with the receiving groove 13 adjacent to the battery compartment 11. The bottom surface of the receiving groove 13 defines two receiving holes 131. Each of the receiving holes 131 includes a first through hole 1311 and a second through hole 1313 communicating with the first through hole 1311. A lateral width of the first through hole 1311 is larger than that of the second through hole 1313 so that the latching element 30 can be retained by the housing 10. The supporting wall 111 defines two spaced latching holes 16 communicating with the cutout 15. A resisting block 17 extends from the second end portion 119 and extends into the battery compartment 11, as shown in FIG. 2.

Figure 3:
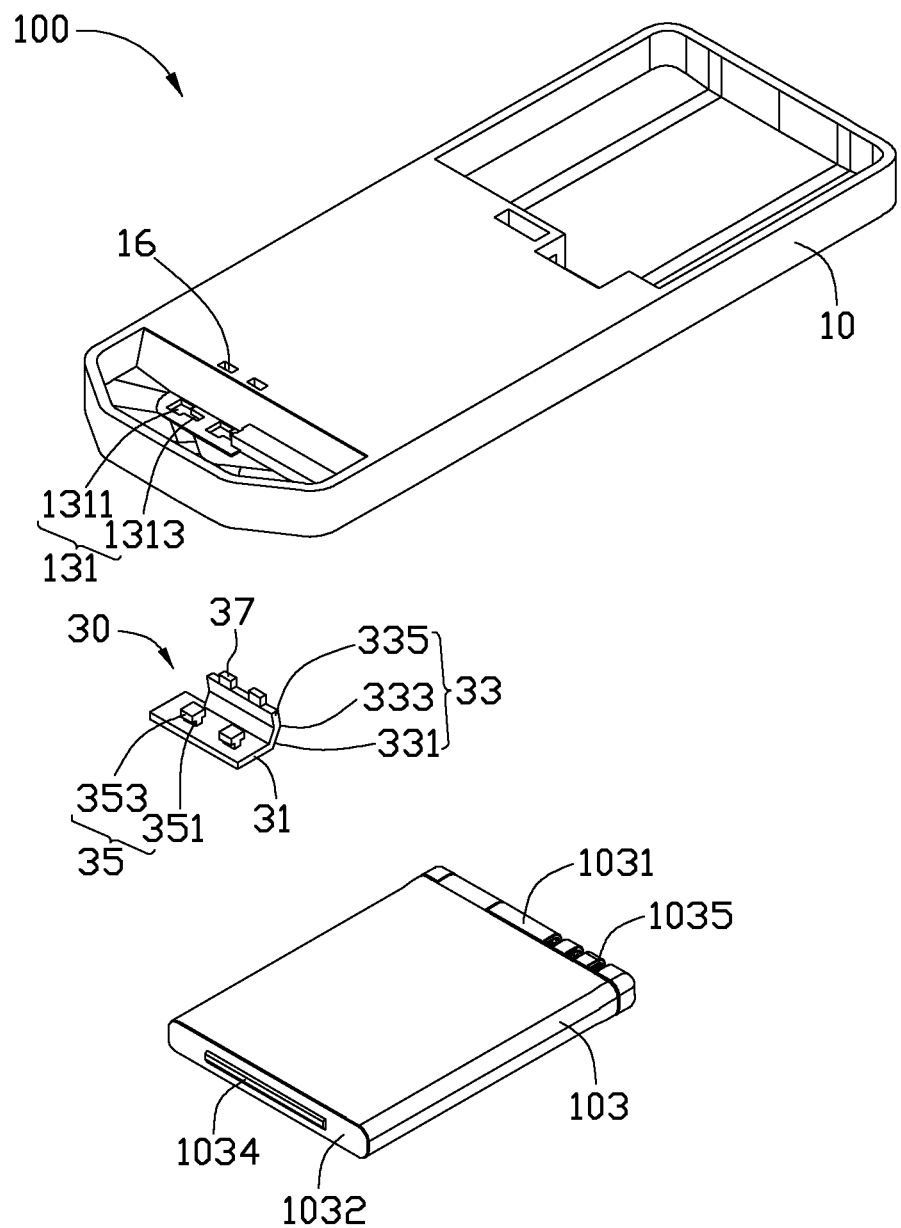
FIG. 3 is similar to FIG. 2, but viewed from another aspect.

Referring to FIG. 3, the latching element 30 is for elastically resisting the battery 103 and integrally formed by means of, e.g., molding or punching a flexible material. The latching element 30 includes a flat plate 31 received in the receiving groove 13 of the housing 10. An extension plate 33 extends at an angle from an edge of the flat plate 31. The extension plate 33 includes a first resisting section 331 and a second resisting section 335. A lip 333 is formed where the first resisting section 331 and the second resisting section 335 meet and configured for retaining the battery 103 in the battery compartment 11. Two connecting blocks 35 are formed on the flat plate 31. Each of the connecting blocks 35 includes a connecting portion 351 and a resisting portion 353. The connecting portion 351 projects from the flat plate 31 and is configured to be received in the second through hole 1313. The resisting portion 353 is substantially perpendicular to the connecting portion 351, parallel to the flat plate 31, and for retaining the latching element 30 on the housing 10 by the friction therebetween. Two protrusions 37 project from a free end of the second resisting section 335.

Referring back to FIGS. 1 and 2, the battery 103 includes a first end 1031 and a second end 1032 opposite to the first end 1031. The first end 1031 defines a slot 1033 to receive the resisting block 17 of the housing 10. A rib 1034 protrudes from the second end 1032 to abut against the latching element 30.

Figure 4:
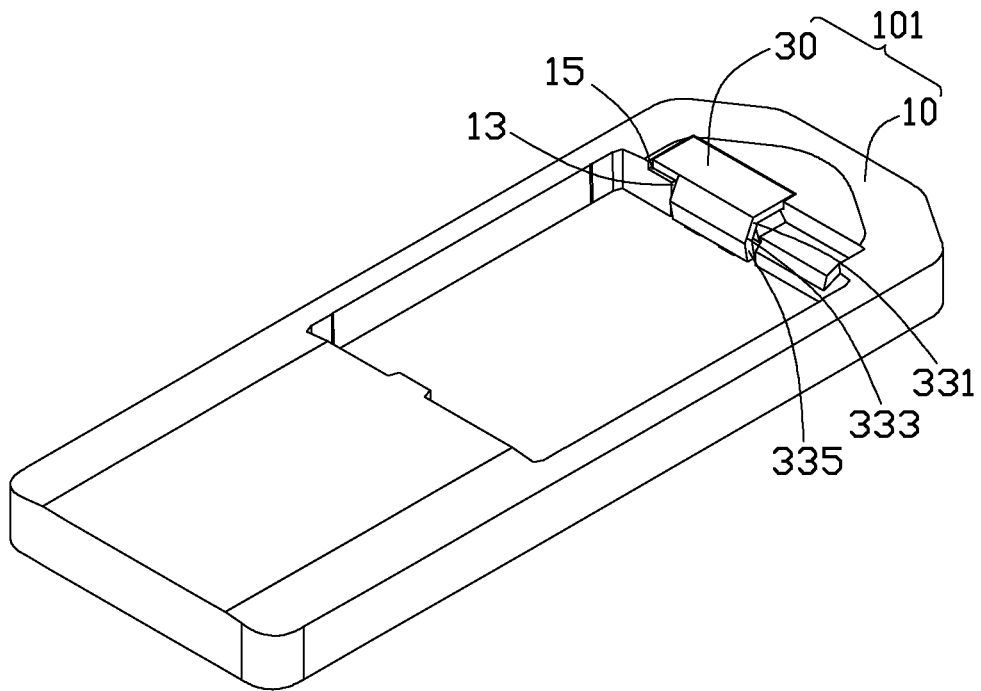
FIG. 4 is an assembled, isometric view of the battery latching mechanism of the portable electronic device of FIG. 1.
Figure 5:
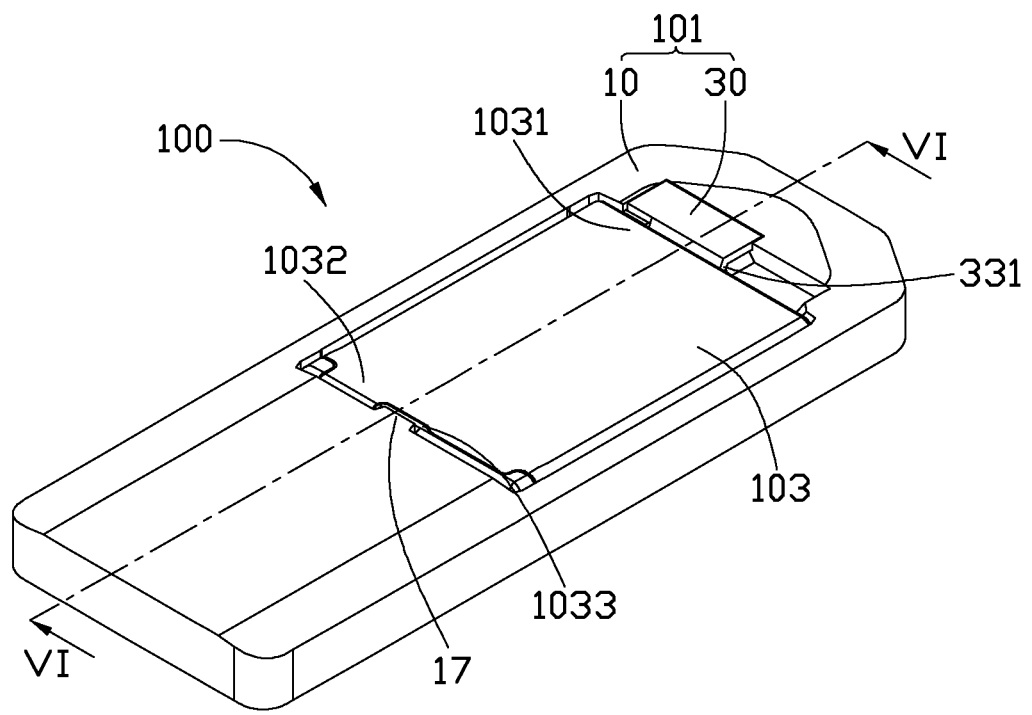
FIG. 5 is an assembled, isometric view of the portable electronic device of FIG. 1.
Figure 6:
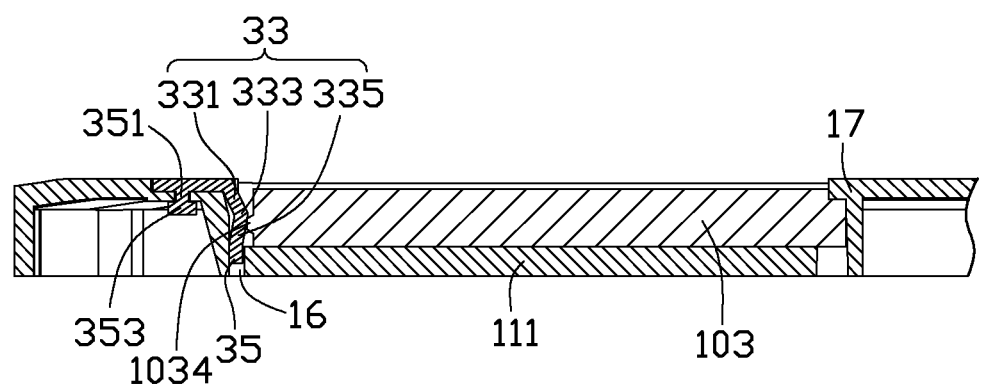
FIG. 6 is across-sectional view of the portable electronic device of FIG. 5 along line VI-VI.

Referring to FIG. 4, during assembly of the battery latching mechanism 101, the flat plate 31 is received in the receiving groove 13 and the extension plate 33 is received in the cutout 15. The connecting blocks 35 respectively pass through a corresponding first through hole 1311. The latching element 30 is slid to a side so that the connecting portions 351 are respectively received in a corresponding second through hole 1313 and therefore locked in place. And the protrusions 37 are inserted into the latching holes 16. Thus, the battery latching mechanism 101 is assembled. The first end 1031 is received in the battery compartment 11, and the resisting block 17 is received in the slot 1033. The battery 103 is pressed so that the second end 1032 rotates into the battery compartment 11. The rib 1034 of the battery 103 is elastically resisted by the extension plate 33 of the latching element 30. The battery 103 is further pressed, until received in the battery compartment 11, and the lip 333 resists the rib 1034 and limits the movement of the battery 103. Thus, the portable electronic device 100 is assembled, as shown in FIGS. 5 and 6. After assembled, the battery 103 can further be secured by a battery cover (not shown) to prevent the battery 103 being easily removed.

It is to be understood that the quantity of latching elements 30 can be two or more.

The portable electronic device 100 has an integrated latching element 30 elastically resisting and limiting the battery 103 so that the battery 103 can be retained in the battery compartment 11.

It is believed that the present embodiments and their advantages will be understood from the foregoing description, and it will be apparent that various changes may be made thereto without departing from the spirit and scope of the disclose or sacrificing all of its material advantages, the examples hereinbefore described merely being preferred or exemplary embodiments of the disclosure.

What is claimed is:

1. A battery latching mechanism for fixing a battery to a portable electronic device comprising:

a housing defining a battery compartment and at least one receiving hole;

a latching element comprising a flat plate, an extension plate extending from the flat plate and reaching into the battery compartment for elastically latching the battery, and at least one connecting block, projecting from the flat plate, received in the receiving hole and resisting the housing, the extension plate comprising a first resisting section, a second resisting section, and a lip formed where the first and second resisting sections meet;

wherein when the battery is received in the battery compartment, the lip resists a rib formed on an end of the battery to limit the movement of the rib; when the extension plate is pressed, the extension plate is compressed and moves away from the rib, thereby releasing itself from the engagement with the rib of the battery to remove the battery.

2. The battery latching mechanism as claimed in claim 1, wherein the at least one connecting block comprises a connecting portion and a resisting portion, the at least one receiving hole comprises a first through hole and a second through hole, the connecting portion passes the first through hole and is received in the second through hole, the resisting portion resists the housing.

3. The battery latching mechanism as claimed in claim 1, wherein a bottom surface of the battery compartment defines at least one latching hole, at least one protrusion extends from the second resisting section, the at least one protrusion is received in the latching hole.

4. The battery latching mechanism as claimed in claim 1, wherein the housing defines a receiving groove, the flat plate of the latching element is received in the receiving groove.

5. A portable electronic device comprising:

a battery;

a housing defining a battery compartment and at least one receiving hole;

a latching element comprising a flat plate, an extension plate extending from the flat plate and reaching into the battery compartment to elastically latch the battery, and at least one connecting block, projecting from the flat plate, being received in the receiving hole and resisting the housing, the extension plate comprising a first resisting section, a second resisting section, and a lip formed where the first and second resisting sections meet;

wherein when the battery is received in the battery compartment, the lip resists a rib formed on an end of the battery to limit the movement of the rib; when the extension plate is pressed, the extension plate is compressed and moves away from the rib, thereby releasing itself from the engagement with the rib of the battery to remove the battery.

6. The portable electronic device as claimed in claim 5, wherein the at least one connecting block comprises a connecting portion and a resisting portion, the at least one receiving hole comprises a first through hole and a second through hole, the connecting portion passes the first through hole and is received in the second through hole, the resisting portion resists the housing.

7. The portable electronic device as claimed in claim 5, wherein a bottom surface of the battery compartment defines at least one latching hole, at least one protrusion extends from the second resisting section, the at least one protrusion is received in the latching hole.

8. The portable electronic device as claimed in claim 5, wherein a resisting block extends from the housing and extends into the battery compartment, another end of the battery defines a slot, the resisting block is received in the slot.

9. The portable electronic device as claimed in claim 5, wherein the housing defines a receiving groove, the flat plate is received in the receiving groove.

10. The portable electronic device as claimed in claim 6, wherein the housing defines a cutout communicating with the receiving groove adjacent to the battery compartment, the extension plate is received in the cutout.

11. The portable electronic device as claimed in claim 6, wherein the resisting portion is perpendicular to the connecting portion and is parallel to the flat plate.

12. The portable electronic device as claimed in claim 11, wherein a lateral width of the first through hole is larger than that of the second through hole.

\* \* \* \* \*